US010211696B2

(12) United States Patent
Yu

(10) Patent No.: US 10,211,696 B2
(45) Date of Patent: Feb. 19, 2019

(54) MOTOR

(71) Applicant: LG INNOTEK CO., LTD., Seoul (KR)

(72) Inventor: Hyun Soo Yu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 520 days.

(21) Appl. No.: 14/071,992

(22) Filed: Nov. 5, 2013

(65) Prior Publication Data
US 2014/0125163 A1 May 8, 2014

(30) Foreign Application Priority Data
Nov. 8, 2012 (KR) .................. 10-2012-0125806

(51) Int. Cl.
H02K 9/16 (2006.01)
H02K 9/19 (2006.01)
H02K 5/20 (2006.01)

(52) U.S. Cl.
CPC .................. H02K 5/20 (2013.01); H02K 9/16 (2013.01); H02K 9/19 (2013.01)

(58) Field of Classification Search
CPC .. H02K 9/06; H02K 3/24; H02K 5/20; H02K 9/00; H02K 9/16; H02K 9/19; H02K 9/193; H02K 5/225; H02K 5/22
USPC ........ 310/58, 59, 63, 61, 52, 54, 89, 64, 65, 310/254.1
See application file for complete search history.

(56) References Cited

U.S. PATENT DOCUMENTS

| 2,862,120 | A | * | 11/1958 | Onsrud | H02K 5/20 165/146 |
| 7,626,292 | B2 | * | 12/2009 | Baumann | H02K 5/20 165/156 |
| 7,737,585 | B2 | * | 6/2010 | Bahr | H02K 5/20 310/52 |
| 2007/0248868 | A1 | * | 10/2007 | Haltiner, Jr. | H01M 8/028 429/434 |
| 2009/0108715 | A1 | * | 4/2009 | Sopp | H02K 9/22 310/60 A |

(Continued)

FOREIGN PATENT DOCUMENTS

CN 2012-70453 7/2009
CN 201270453 Y * 7/2009

(Continued)

OTHER PUBLICATIONS

Niwa (JP 10210702 A) Engliish Translation.*

(Continued)

*Primary Examiner* — Quyen P Leung
*Assistant Examiner* — Robert E Mates
(74) *Attorney, Agent, or Firm* — KED & Associates, LLP

(57) ABSTRACT

A motor may include first housing installed with a stator and a rotor, and a second housing configured to form a refrigerant passage by being distanced from the first housing. When the second housing is coupled to the first housing, a first pipe is configured to introduce refrigerant into the refrigerant passage by communicating with the refrigerant passage, and a second pipe is configured to discharge the introduced refrigerant. A plurality of passage lugs are configured to be positioned at the refrigerant passage to flow the refrigerant in a zigzag manner.

11 Claims, 4 Drawing Sheets

(56) References Cited

U.S. PATENT DOCUMENTS

2010/0033039 A1   2/2010  Sakai et al.
2012/0216398 A1*  8/2012  Agapiou ............ H02K 15/0081
                                                      29/868

FOREIGN PATENT DOCUMENTS

| CN | 101951069 | | | 1/2011 |
|----|-----------|---|---|--------|
| CN | 101951069 | A | * | 1/2011 |
| CN | 202076876 | | | 12/2011 |
| DE | 19624519 | | | 1/1998 |
| DE | 10-2009-001387 | | | 9/2010 |
| JP | U05088185 | A | | 11/1993 |
| JP | 06269143 | A | * | 9/1994 |
| JP | 07322567 | A | * | 12/1995 |
| JP | 10210702 | A | * | 8/1998 |
| JP | 2004-312886 | | | 11/2004 |
| JP | 2007-536887 | | | 12/2007 |
| JP | 2008-187754 | | | 8/2008 |
| JP | 2010-041835 | | | 2/2010 |
| WO | WO 2005/112228 | | | 11/2005 |

OTHER PUBLICATIONS

Koizumi (JP 06269143 A) English Translation.*
Niwa (JP 10210702 A) English Translation.*
Wei (CN 201270453 Y) English Translation.*
Zhang (CN 101951069 A) English Translation.*
Takeda (JP 07322567 A) English Translation.*
Chinese Office Action dated Feb. 3, 2017 issued in Application No. 201310553037.2.
Japanese Office Action issued in Application 2013-230471 dated Sep. 26, 2017 (full Japanese text).
European Search Report dated Feb. 28, 2018 issued in Application No. 13191573.8.
Japanese Office Action dated May 8, 2018 issued in Application No. 2013-230471.

\* cited by examiner

MOTOR

CROSS-REFERENCE TO RELATED APPLICATION

The present application is based on, and claim priority from, Korean Application Number 10-2012-0125806, filed on Nov. 8, 2012, the disclosure of which is incorporated by reference herein in its entirety.

BACKGROUND

1. Field

Exemplary aspects of the present disclosure relate to a motor configured to perform a cooling operation using cooling water.

2. Background

A motor is an electric machine that converts electrical energy into mechanical energy (turning effect) and widely used as a power source. In normal motoring mode, a large quantity of heat is generated when a motor generates the turning effect by consuming the electric energy, and efficiency of motor greatly decreases by the heat generated by the motor. Recently, a water-cooling jacket is used to quickly remove the heat generated by the motor in case of a high power vehicular motor.

A pipe inserting type is widely used for a general water-cooling motor, where the pipe inserting type includes a pipe configured to pass refrigerant by passing through an interior of a stator or a housing that generates a large quantity of heat. However, the conventional pipe inserting type suffers from various disadvantages in that structure is complicated, a space inside the motor is greatly restricted by the pipe, and a cooling efficiency is very low.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION OF PREFERRED EMBODIMENTS

Figure 1:
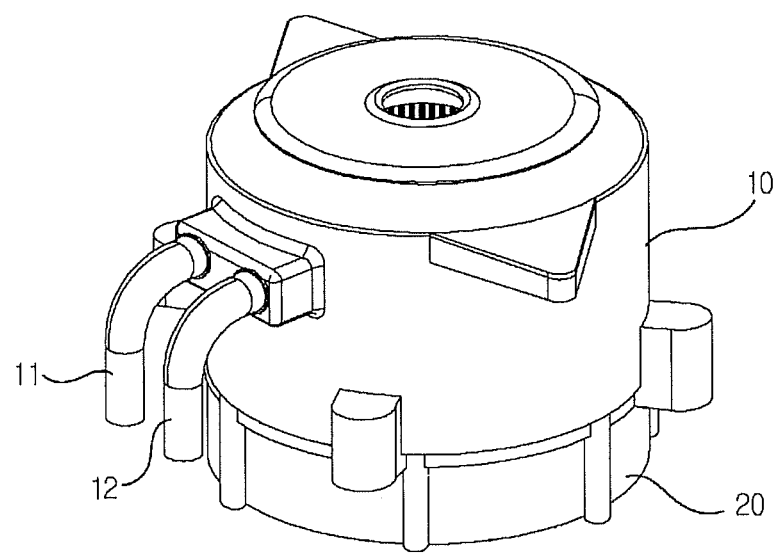
FIG. 1 is a schematic perspective view of an assembled motor according to a first exemplary embodiment of the present disclosure.

Now, a motor according to exemplary embodiments of the present disclosure will be described in detail with reference to the accompanying drawings.

Unless defined otherwise, all the meanings of terms or words used in the specification and claims are same as those generally understood by those skilled in the art, and therefore, if there is any confliction between the terms or words used in the specification and claims and the generally used ones, the definition of the terms or words used in the specification and claims shall prevail.

However, the present disclosure is herein described, by way of example only, with reference to the accompanying drawings. Thus, the following exemplary embodiments are described and only used to facilitate description of the present disclosure, and in no way limit the scope of the disclosure. Furthermore, throughout the descriptions, the same reference numerals will be assigned to the same elements in the explanations of the figures.

Figure 2:
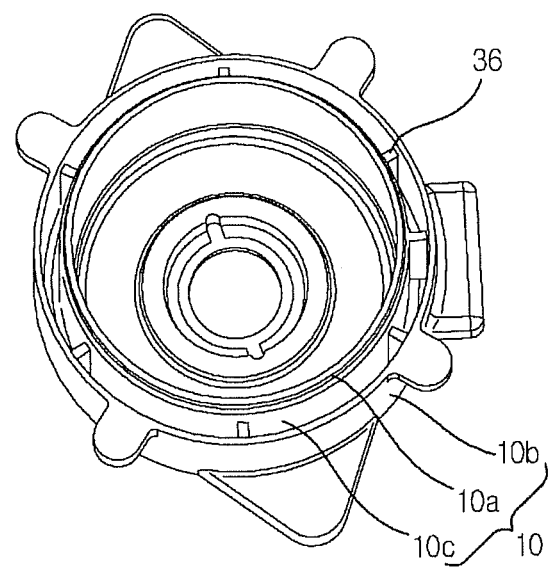
FIG. 2 is a perspective view of a rear side of a first housing according to a first exemplary embodiment of the present disclosure.
Figure 3:
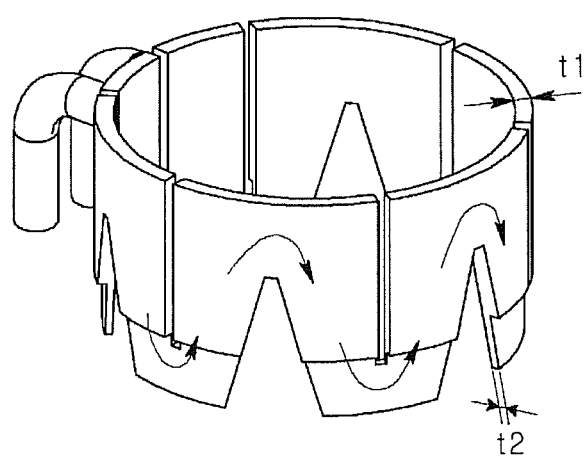
FIG. 3 is a 3D (three-dimensional) view illustrating a shape of a refrigerant passage formed by first and second housings according to a first exemplary embodiment of the present disclosure.
Figure 4:
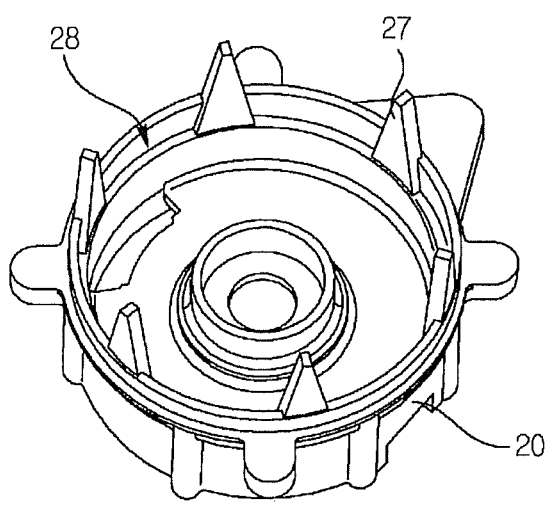
FIG. 4 is a perspective view of a second housing according to a first exemplary embodiment of the present disclosure.

FIG. 1 is a schematic perspective view of an assembled motor according to a first exemplary embodiment of the present disclosure, FIG. 2 is a perspective view of a rear side of a first housing according to a first exemplary embodiment of the present disclosure, FIG. 3 is a 3D (three-dimensional) view illustrating a shape of a refrigerant passage formed by first and second housings according to a first exemplary embodiment of the present disclosure, and FIG. 4 is a perspective view of a second housing according to a first exemplary embodiment of the present disclosure.

Referring to FIGS. 1, 2 and 3, the motor according to an exemplary embodiment of the present disclosure includes vertically coupled first and second housings (10, 20) and a space part (10*c*) formed between the first and second housings (10, 20) through which refrigerant is supplied to cool the motor.

To be more specific, the first housing (10) is formed at an outermost side of the motor, and includes an inner case (10*a*) mounted with motor parts including a stator and a rotor (not shown), and an outer case (10*b*) spaced apart from the inner case at a predetermined distance. A plurality of space parts (10*c*) divided by a plurality of rib members (36) may be formed between the inner case (10*a*) and the outer case (10*b*). The plurality of space parts (10*c*) may be formed, each with a same size, to allow forming a passage for flowing uniform and constant refrigerant. The first housing (10) may be formed with a metal material having an excellent heat-radiating property.

According to an exemplary embodiment of the present disclosure, the plurality of space parts (10*c*) may be partially or wholly formed along a periphery between the inner case (10*a*) and the outer case (10*b*), and the size and volume of the space part (10*c*) may vary depending on temperature of the motor and an amount of refrigerant for cooling the motor.

Referring to FIG. 1 again, the first housing (10) may a first pipe (11) configured to introduce refrigerant and a second pipe (12) configured to discharge the refrigerant introduced through the first pipe (11). The refrigerant introduced and discharged through the first pipe (11) and the second pipe (12) may be replaced with water, and a separate refrigerant circulation pump unit (not shown) may be connected to facilitate input and output of the refrigerant. The first and second pipes (11, 12) may be coupled to the first housing (10) for connection to a refrigerant passage (15).

Referring to FIG. 3 again, the refrigerant passage (15) is formed at the space part (10c) formed by the first and second housings (10, 20). To be more specific, an upper surface of the refrigerant passage (15) may have a thickness (t1), which is a distance between the inner case (10a) and the outer case (10b), and a lower surface of the refrigerant passage (15), which is a thickness (t2) of a surface faced by the inner case (10a) and the second housing (20), may be smaller than the thickness (t1) forming the refrigerant passage (15). When the thickness (t1) is greater than the thickness (t2), the passage is widened and thinned to broaden a contact surface of refrigerant and to minimize a motor diameter.

Meanwhile, referring to FIG. 4, the second housing (20) is coupled to a lower surface of the first housing (10), and the refrigerant passage (150) may be formed through the coupling with the first housing (10) according to an exemplary embodiment of the present disclosure.

To be more specific, an upper surface of a circumferential surface of the second housing (20) may be formed with a plurality of passage lugs (27), and the plurality of passage lugs (27) is positioned at the space part (10c) to form a circulation passage of the refrigerant when the second housing (20) is coupled to the first housing (10).

Although the passage lug (27) may be formed with a semi-circle or with a polygonal shape, the passage lug (27) may be formed in a shape of an isosceles triangle to facilitate input and output of refrigerant and to smooth movement of refrigerant.

Meanwhile, a coupling part between the first and second housings (10, 20) may be inserted by a ring member (not shown) for sealing purpose, where the ring member can prevent the refrigerant from leaking from the space part (10c). The ring member may be provided with an O-ring, and albeit not being shown, an insertion cross-section of the O-ring may be formed with a staircase to minimize an assembly pressure that may be generated during insertion of the O-ring.

Figure 5:
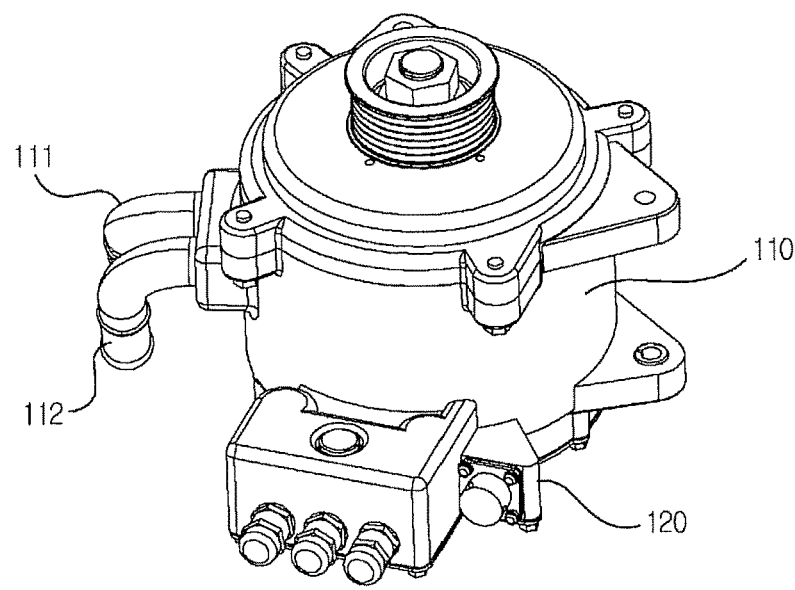
FIG. 5 is a schematic perspective view of an assembled motor according to a second exemplary embodiment of the present disclosure.
Figure 6:
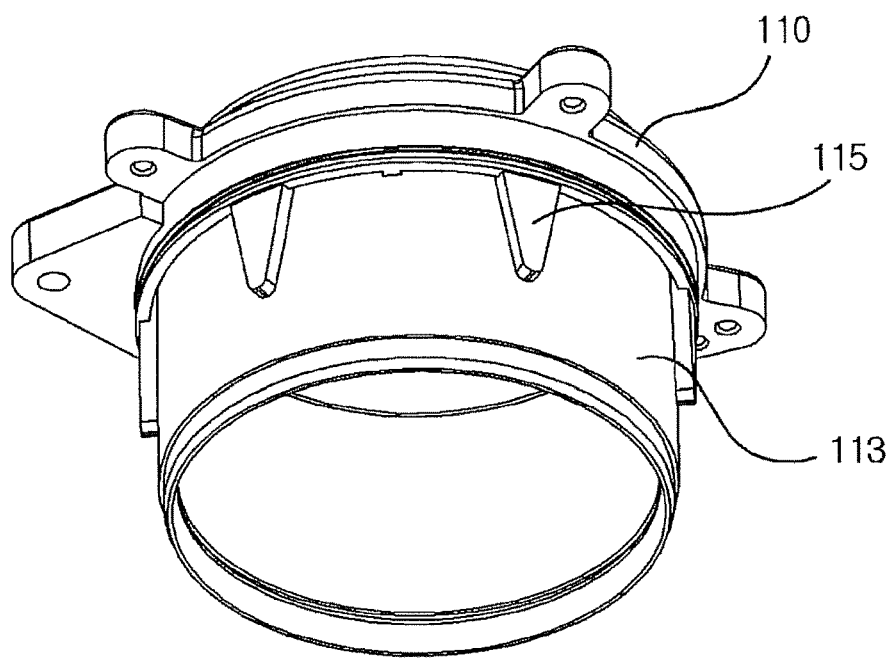
FIG. 6 is a perspective view of a rear side of a first housing according to a second exemplary embodiment of the present disclosure.
Figure 7:
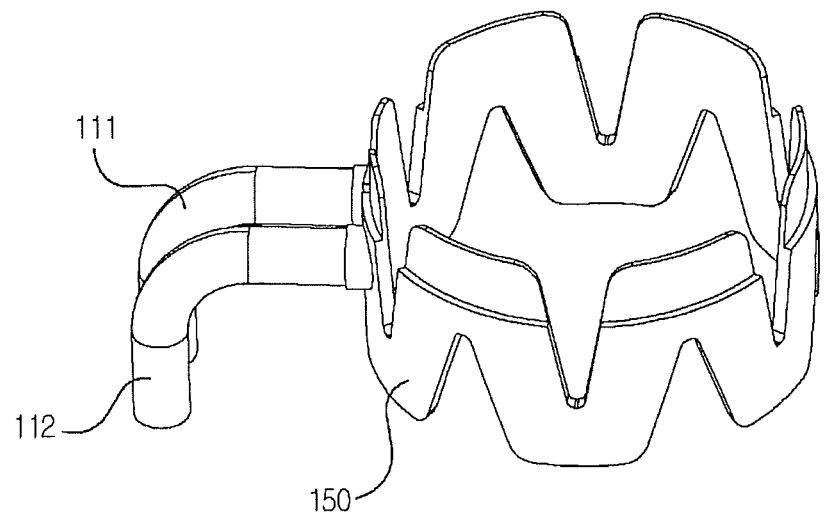
FIG. 7 is a 3D (three-dimensional) view illustrating a shape of a refrigerant passage formed by first and second housings according to a second exemplary embodiment of the present disclosure.
Figure 8:
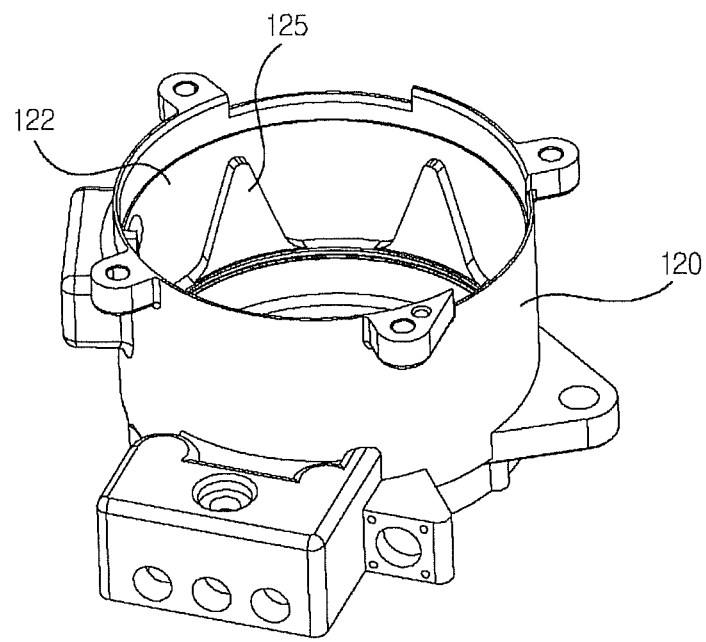
FIG. 8 is a perspective view of a second housing according to a second exemplary embodiment of the present disclosure.

FIG. 5 is a schematic perspective view of an assembled motor according to a second exemplary embodiment of the present disclosure, FIG. 6 is a perspective view of a rear side of a first housing according to a second exemplary embodiment of the present disclosure, FIG. 7 is a 3D (three-dimensional) view illustrating a shape of a refrigerant passage formed by first and second housings according to a second exemplary embodiment of the present disclosure, and FIG. 8 is a perspective view of a second housing according to a second exemplary embodiment of the present disclosure.

A motor according to the second exemplary embodiment of the present disclosure may be formed with first and second housings (110, 120) as in the first exemplary embodiment, but unlike the first exemplary embodiment, a lateral wall of the second housing (120) is connected by first and second pipes (111, 112) to allow refrigerant to be introduced or discharged.

The first housing (110) may be provided with a plurality of first passage lugs (115) at a connection part with the second housing (120) each at a predetermined distance. To be more specific, as illustrated in FIG. 6, the first passage lugs (115) may be protrusively formed on an external circumferential surface of a cylindrical insertion case (113) each at a predetermined distance. Furthermore, the first housing (110) may be formed with a metal material having an excellent heat-radiating property.

Referring to FIG. 7, a refrigerant passage (150) may be provided with a space part formed by coupling between the first and second housings (110, 120), where the cylindrical insertion case (113) of the first housing (110) may be an inner lateral surface of the refrigerant passage (115) and an inner circumferential surface of the inside case (122) of the second housing (120) may be an external surface of the refrigerant passage (150). At this time, an inner surface of the second housing (120) may be provided with a second passage lug (125) at a position not interfered by the first passage lug (115). At this time, each of the first and second passage lugs (115, 125) may preferably take a mutually corresponding shape, and according to an exemplary embodiment of the present disclosure, the passage lugs may be provided in a shape of an isosceles triangle having a mutually different width.

As illustrated in FIG. 7, the refrigerant passage according to the second exemplary embodiment of the present disclosure can be provided with a predetermined width to allow the refrigerant passage to be formed in a zigzag manner, such that even if a flow direction of the refrigerant is changed, increase or decrease of amount of refrigerant can be minimized to allow the refrigerant to flow in the refrigerant passage (150) without any stagnation. Furthermore, structure of the refrigerant passage according to the second exemplary embodiment of the present disclosure has an effect of lengthening a refrigerant passage over that of the rib member (36) or the passage lug (27) according to the first exemplary embodiment to enhance a cooling efficiency of a motor.

Hereinafter, a cooling operation of a motor according to the first and second exemplary embodiments of the present disclosure will be described with reference to FIGS. 1 to 8.

Referring to FIGS. 1 to 4, the motor according to the first exemplary embodiment of the present disclosure includes a structure configured to circulate a liquid refrigerant at a circumference of the motor whereby heat generated in the course of operation of the motor can be cooled. When the motor is operated, refrigerant may be introduced through the first pipe (11), and the introduced refrigerant may be filled in the refrigerant passage (15) provided between the inner case (10a) and the outer case (10b) of the first housing (10) to move in a zigzag manner and to be discharged to the second pipe (12).

Referring to FIGS. 5 to 8, the motor according to the second exemplary embodiment of the present disclosure is configured such that the refrigerant passage (150) formed by coupling between the first and second housings (110, 120) is provided with a zigzag width, whereby the refrigerant flowing through the refrigerant passage (150) can be discharged to the second pipe (112) without any stagnation.

Furthermore, a cooling performance can be enhanced over the prior art to allow installing an increased winding number of coils, whereby a motor efficiency can be enhanced.

Exemplary aspects of the present disclosure are directed to provide a refrigerant passage structure-improved water-cooling motor configured to enhance a cooling efficiency by forming a housing in a dual structure, and by improving a flowing structure of refrigerant passing through an interior of the dual structured housing.

In one general aspect of the present disclosure, there is provided a motor, the motor comprising a first housing installed with a stator and a rotor; a second housing configured to form a refrigerant passage by being distanced from the first housing, when the second housing is coupled to the first housing; a first pipe configured to introduce refrigerant into the refrigerant passage by communicating with the refrigerant passage, and a second pipe configured to discharge the introduced refrigerant; and a plurality of passage lugs configured to be positioned at the refrigerant passage to flow the refrigerant in a zigzag manner.

A first housing may include an inner case installed with a stator and a rotor, an outer case spaced apart from the inner case at a predetermined distance, and a plurality of space parts formed by being divided by a plurality of rib members configured to connect the inner case and the outer case, and the second housing may be coupled to a lower side of the first housing and may include a passage lug configured to be positioned at the space part during coupling to the first housing.

Each of the plurality of space parts may be spaced apart at an equal distance.

A plurality of space parts may be formed along a periphery of the first housing.

A passage lug may be provided in a polygonal shape.

A passage lug may be provided in a shape of an isosceles triangle.

A first housing may be formed with a metal material.

A refrigerant passage may be configured such that a thickness (t1), which is a distance between the inner case and the outer case forming the refrigerant passage, may be greater than a thickness (t2) of a surface faced by the inner case and the second housing.

A refrigerant passage may be formed by a cylindrical insertion case disposed on the first housing to form an inner surface of the refrigerant passage, and an inside case disposed on the second housing to form an external surface of the refrigerant passage, and the passage lug may be formed on any one of an external circumferential surface of the insertion case and an inner circumferential surface of the inside case.

A passage lug may include a first passage lug formed on the external circumferential surface of the insertion case at a predetermined distance, and a second passage lug formed on the inner circumferential surface of the inside case.

Each of the first and second passage lugs may take a mutually corresponding shape.

A passage lug may be provided in a polygonal shape, and may be provided in a shape of an isosceles triangle.

A first housing may be formed with a metal material having an excellent heat-radiating property.

In an advantageous effect of the motor according to the present disclosure, a moving route of the refrigerant is formed in a zigzag manner to allow refrigerant to stay in a motor housing at a maximal period of time, whereby the motor can be cooled more efficiently.

Another advantageous effect is that a shape of a housing forming the motor is partially changed, dispensing with a separate installation of a passage-forming member, whereby an assembly process of the motor can be shortened, and no additional expense is generated during the assembly process.

Still another advantageous effect is that a cooling efficiency can be improved over the prior art to allow installing an increased winding number of coils, whereby a motor efficiency can be enhanced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor, the motor comprising:
   a first housing including an inner case installed with a stator and a rotor and an outer case spaced apart from the inner case, the outer case being protrusively formed with a plurality of rib members that extend from the outer case to the inner case to form a plurality of divided space parts between the inner case and the outer case;
   a second housing separately formed from the first housing and coupled to a lower side of the first housing, the second housing being formed with a plurality of isosceles triangle-shaped passage lugs each separately extending in a rotor shaft direction of the motor into a corresponding divided space part to form a refrigerant passage through the first housing and the second housing, wherein the plurality of isosceles triangle-shaped passage lugs are provided at an inner circumferential surface of the second housing, and
   a first pipe configured to introduce a refrigerant into the refrigerant passage and a second pipe configured to discharge the refrigerant from the refrigerant passage,
   wherein the refrigerant passage includes a first passage positioned in the first housing between the inner case and the outer case and a second passage positioned between the inner case of the first housing and the second housing and communicated to the first passage, and the first passage and the second passage are configured to form the refrigerant passage in a zigzag manner in the rotor shaft direction of the motor,
   wherein a first thickness of the first passage in the first housing between the inner case and the outer case is greater than a second thickness of the second passage between the inner case of the first housing and the second housing, wherein the first thickness is a distance between the inner case and the outer case, and the second thickness is a distance between the inner case of the first housing and the second housing,
   wherein an axial length of the first passage is longer than an axial length of the second passage,
   wherein an outer circumferential surface of the first passage at the outer case has a diameter wider than a diameter of an outer circumferential surface of the second passage at the second housing,
   wherein a diameter of an inner circumferential surface of the first passage is the same as a diameter of an inner circumferential surface of the second passage,
   wherein the isosceles triangle-shaped passage lugs have a thickness greater than the second thickness such that the lug extends in an inner radial direction from the inner circumferential surface of the second housing.

2. The motor of claim 1, wherein the plurality of divided space parts is formed by being divided by the plurality of rib members, and the plurality of isosceles triangle-shaped passage lugs is protrusively formed on the inner circumferential surface of the second housing.

3. The motor of claim 2, wherein each of the plurality of divided space parts is spaced apart at an equal distance.

4. The motor of claim 2, wherein the plurality of divided space parts is protrusively formed along a periphery of the first housing.

5. The motor of claim 1, wherein the first housing is formed with a metal material.

6. The motor of claim 2, wherein the plurality of divided space parts is partially or wholly formed along a periphery between the inner case and the outer case.

7. The motor of claim 6, wherein each of the plurality of divided space parts is formed in a same size.

8. The motor of claim 2, wherein the plurality of isosceles triangle-shaped passage lugs are respectively positioned at the plurality of divided space parts to form a circulation passage of the refrigerant passage.

9. The motor of claim 1, wherein the outer circumferential surface of the first housing is an inner lateral surface of the refrigerant passage, and the inner circumferential surface of the second passage is an external surface of the refrigerant passage.

10. The motor of claim 1, wherein the refrigerant passage is configured in the zigzag manner.

11. The motor of claim 1, wherein each isosceles triangle-shaped passage lug separately extends to about a mid-portion of the first passage in the first housing.

* * * * *